US009577785B2

(12) United States Patent
Liberti et al.

(10) Patent No.: US 9,577,785 B2
(45) Date of Patent: Feb. 21, 2017

(54) SIGNAL JAMMING SUPPRESSION

(71) Applicant: Vencore Labs, Inc., Basking Ridge, NJ (US)

(72) Inventors: Joseph C. Liberti, Basking Ridge, NJ (US); Nicholas Chang, Basking Ridge, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 0 days.

(21) Appl. No.: 14/813,354

(22) Filed: Jul. 30, 2015

(65) Prior Publication Data

US 2016/0036556 A1 Feb. 4, 2016

Related U.S. Application Data

(60) Provisional application No. 62/030,883, filed on Jul. 30, 2014.

(51) Int. Cl.
*H04B 1/00* (2006.01)
*H04B 15/00* (2006.01)
*H04K 3/00* (2006.01)

(52) U.S. Cl.
CPC .................................... *H04K 3/224* (2013.01)

(58) Field of Classification Search
CPC .......... H04K 3/00; H04K 3/224; H04B 1/525; H04W 72/00; H04W 72/0453; H04W 28/04
USPC ....................................... 455/1, 39, 63.1, 73
See application file for complete search history.

(56) References Cited

U.S. PATENT DOCUMENTS

| | | | |
|---|---|---|---|
| 7,593,489 | B2 | 9/2009 | Koshy et al. |
| 7,773,705 | B2 | 8/2010 | Jung et al. |
| 8,340,206 | B2 | 12/2012 | Martin et al. |
| 8,515,335 | B2 | 8/2013 | Dafesh et al. |
| 8,737,539 | B2 | 5/2014 | Koshy |
| 8,744,395 | B1 | 6/2014 | Mitchell |
| 8,942,658 | B2 | 1/2015 | Banwell et al. |
| 9,054,752 | B2 | 6/2015 | Woodward et al. |
| 9,509,365 | B2 | 11/2016 | Wyville et al. |

(Continued)

OTHER PUBLICATIONS

J.C. Liberti, et al., "Evaluation of Several Algorithms for Canceling Acoustic Noise in Mobile Radio Environments," *Proceedings of the 41st IEEE Vehicular Technology Conference, St. Louis, Missouri*, May 1991.

(Continued)

*Primary Examiner* — Ayodeji Ayotunde
(74) *Attorney, Agent, or Firm* — Heslin, Rothenberg, Farley & Mesiti; George S. Blasiak

(57) ABSTRACT

Provided are processes for suppressing jamming signals that may include use of a signal processing circuit. A signal processing circuit can be configured to obtain a jamming signal and a feedback signal, process the jamming signal and the feedback signal to determine a cancellation signal for use in suppressing the jamming signal, and output the cancellation signal to a radio-frequency transmitter. The signal processing circuit may be further configured to obtain a transmission signal, determine a jamming channel from the jamming signal and a feedback channel from the feedback signal, and combine the transmission channel, jamming channel, and feedback channel to determine a transfer function, where the transfer function is configured to determine the cancellation signal.

28 Claims, 6 Drawing Sheets

(56) References Cited

U.S. PATENT DOCUMENTS

| | | | | |
|---|---|---|---|---|
| 2010/0289688 | A1* | 11/2010 | Sherman ................ | H04K 3/228 342/16 |
| 2012/0051239 | A1 | 3/2012 | Thai | |
| 2013/0102254 | A1* | 4/2013 | Cyzs ...................... | H04B 1/126 455/63.1 |
| 2014/0194071 | A1* | 7/2014 | Wyville ................. | H04B 1/525 455/73 |
| 2014/0355708 | A1 | 12/2014 | Kang et al. | |

OTHER PUBLICATIONS

D. W. Bliss, et al., "MIMO Wireless Channel Phenomenology," *IEEE Trans. Ant. And Prop.*, vol. 52, No. 8, p. 2073-2082, Aug. 2004.

M. Sharp, et al., "Distributed Randomized Space Time Coding for HF Transmission," *MILCOM*, 2006.

Hung-Quoc Lai, et al., "Measurements of Multiple-Input Multiple-Output (MIMO) Performance under Army Operational Conditions," *Military Communication Conference*, 2010-*MILCOM*, p. 2119-2124, Oct. 31, 2010 — Nov. 3, 2010.

* cited by examiner

SIGNAL JAMMING SUPPRESSION

CROSS-REFERENCE TO RELATED APPLICATIONS

This application is related to U.S. Patent Application Ser. No. 62/030,883, filed Jul. 30, 2014, entitled “Signal Jamming Suppression”, which is hereby incorporated by reference in its entirety.

FIELD OF THE INVENTION

The present invention relates to processes for suppression of jamming signals in general, and more specifically to a STAR node operative to suppress jamming signals.

BACKGROUND

Jamming signals may be commonly used to disrupt clear communications between a transmitter and a receiver. The ability to suppress jamming signals to enable clear communications may be essential in many applications, including military or intelligence operations. Present methods of suppressing jamming signals may carry with them significant drawbacks that may prevent their implementation in certain types of locations or operation, or may be impractical to implement due to limitations of existing communications equipment. There is thus a continuing need to develop novel apparatuses and methods of suppressing jamming signals that may be adapted to a broad range of operations and apparatuses.

BRIEF DESCRIPTION

The shortcomings of the prior art are overcome and additional advantages are provided through the provision, in one aspect, of a method including: obtaining a jamming signal and a feedback signal from a radio-frequency receiver; processing the jamming signal and the feedback signal; and, outputting a cancellation signal to a radio-frequency transmitter.

In another aspect, additional advantages may be provided through the provisions of an apparatus that includes a signal processing circuit, the signal processing circuit being configured to perform a method, wherein the method includes: obtaining a jamming signal and a feedback signal from a radio-frequency receiver; processing the jamming signal and the feedback signal; and, outputting a cancellation signal to a radio-frequency transmitter.

In another aspect, additional advantages may be provided through the provision of an apparatus including a signal processing circuit, the signal processing circuit being configured to: obtain, using a radio-frequency receiver, a transmission signal and a jamming signal; transmit a feedback signal using a radio-frequency transmitter; and, obtain using the radio-frequency receiver a cancellation signal.

Additional features and advantages may be realized as set forth herein. Other embodiments and aspects are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages as set forth herein are apparent from the following detailed description taken in conjunction with the accompanying drawings in which:

DETAILED DESCRIPTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Reference is made below to the drawings, which are not drawn to scale for ease of understanding, wherein the same reference numbers used throughout different figures designate the same or similar components.

Figure 1A:
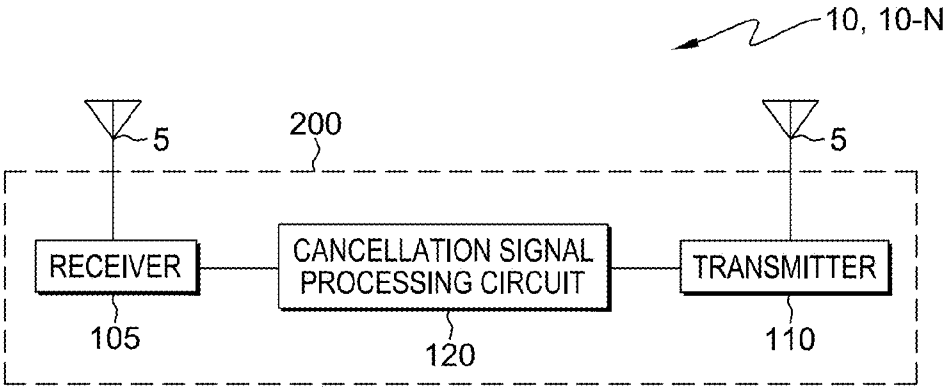
FIG. 1A is a functional block diagram of an embodiment of a signal processing circuit of a node (apparatus) capable of simultaneously receiving a signal and transmitting a transformed signal, in accordance with one or more aspects of the invention.

FIG. 1A is a functional block diagram of an embodiment of a node (apparatus) 10, 10-N including a signal processing circuit 200. Node 10, 10-N may be referred to as a Simultaneous Transmit And Receive (STAR) node, and includes a circuit capable of obtaining a signal, performing at least one transformation on the signal, and outputting the transformed signal, in accordance with one or more aspects as set forth herein. The circuit may be signal processing circuit 200. Node 10, 10-N, generally noted as node 10, is represented specifically as nodes 10-0, 10-1, etc. in FIGS. 4A-4D. Signal processing circuit 200 of node 10, 10-N may include a radio-frequency receiver 105 (receiver), a radio-frequency transmitter 110 (transmitter) and a cancellation signal processing circuit 120. Cancellation signal processing circuit 120 can output a cancellation signal to transmitter 110 which can transmit the cancellation signal for emission by antenna 5 coupled to transmitter 110. Each of receiver 105 and transmitter 110 may be coupled to one or more antennae 5. Functionally, receiver 105 may be responsible for receiving one or more signals, such as a jamming signal and a feedback signal, and making those signals available to cancellation signal processing circuit 120. Similarly, transmitter 110 may functionally be responsible for transmitting, for emission by antenna 5 that may be coupled to transmitter 110, a signal (e.g., a cancellation signal) output by cancellation signal processing circuit 120.

In one example, receiver 105 may be an oscillator-based receiver, for example, a superheterodyne receiver. Receiver 105 may handle one or more signal processing functions typically associated with oscillator-based receivers, such as signal mixing, filtering, amplification, and de-modulation of signals, in receiving one or more signals and making those signals available to cancellation signal processing circuit 120. Similarly, in one example, transmitter 110 may be an oscillator-based transmitter, for example, a superheterodyne transmitter, and may handle one or more signal processing functions typically associated with oscillator-based transmitters, such as amplifying and filtering a signal (including a cancellation signal), performing impedance matching, and modulating a carrier wave signal with a signal output by cancellation signal processing circuit 120. In another example, antenna 5 may pick up a signal and responsively output an electrical signal received by receiver 105. Receiver 105 may be, in a simple form, a conductor coupling an antenna 5 to a cancellation signal processing circuit 120, so that receiver 105 may receive an electrical signal via antenna 5 and conduct the electrical signal to cancellation signal processing circuit 120. In one embodiment, receiver 105 may amplify and filter a radio signal picked up by antenna 5. Similarly, an antenna 5 may emit a signal in response to an electrical signal output from transmitter 110. Transmitter 110 may be, in a simple form, a conductor coupling cancellation signal processing circuit 120 to antenna 5, so that transmitter 110 may receive an electrical signal from cancellation signal processing circuit 120 and transmit the electrical signal to antenna 5. In one embodiment, transmitter 110 may also amplify and/or filter a signal output by cancellation signal processing circuit 120. In one embodiment transmitter 110 may modulate a carrier wave signal with a signal output by cancellation signal processing circuit 120. It may be understood that receiver 105 and transmitter 110 need not be of similar types, and either receiver 105 or transmitter 110 may, in other embodiments, handle a portion of the functions described above, and may handle additional signal processing functions.

Functionally, cancellation signal processing circuit 120 can be a signal processing circuit that may be responsible for processing a jamming signal and a feedback signal to determine a cancellation signal. Cancellation signal processing circuit 120 can be a signal processing circuit that may obtain, as input, a jamming signal and a feedback signal that may be made available by receiver 105. Obtaining either type of signal by cancellation signal processing circuit 120 may include, for example, obtaining the underlying baseband signal, such as a baseband jamming signal and a baseband feedback signal, or other signal having a reduced frequency (e.g., an intermediate frequency signal) as may be output by receiver 105 which can include a representation of the corresponding carrier wave signal (e.g., the jamming carrier wave signal and the feedback carrier wave signal), as may occur in embodiments where, for example, receiver 105 is provided by an oscillator-based, e.g. superheterodyne, receiver. Obtaining a jamming signal or a feedback signal by cancellation signal processing circuit 120 may include, in another example, obtaining a radio-frequency signal as may be picked up by antenna 5, such as a radio-frequency jamming signal or a radio-frequency feedback signal, which may include obtaining a modulated carrier wave signal. A radio-frequency signal may, in one example, be a signal picked up by antenna 5 coupled to receiver 105 that has not been subjected filtering, amplification, or other signal processing or transformation prior to being obtained by cancellation signal processing circuit 120. A radio-frequency signal may also be, in another example, a signal picked up by antenna 5 coupled to receiver 105 that may be subject to filtering and/or amplification by receiver 105, but may not be de-modulated, prior to being obtained by cancellation signal processing circuit 120. Regardless of the form in which signal information is obtained, cancellation signal processing circuit 120 may apply a transfer function. In one embodiment, the transfer function may be chosen or configured to calculate a ratio of at least three frequency-dependent channels, and may further include additional variable dependencies, such as a delay function dependent on a delay time variable. The frequency-dependent channels may include a transmission channel, a jamming channel, and a feedback channel. The feedback channel may correspond to a channel between the node 10, 10-N and a receiver node 20, 20-N, as described below. The jamming channel may correspond to a channel between the node 10, 10-N and a jamming node 30, 30-N, as described below and depicted in FIGS. 4A-4D. The transmission channel may then be the channel between the receiver node 20, 20-N and the jamming node 30, 30-N. The transfer function may be used by cancellation signal processing circuit 120 to determine an appropriate cancellation signal. The cancellation signal may be determined to suppress the jamming signal. In one example, the cancellation signal may completely suppress the jamming signal; in another example, the cancellation signal may suppress a portion of the jamming signal to suppress effects of the jamming signal at a receiver node 20, 20-N. Cancellation signal processing circuit 120 may then output the cancellation signal to transmitter 110. The cancellation signal output from cancellation signal processing circuit 120 may, in one example, include after application of a transfer function by cancellation signal processing circuit

120 a baseband signal, such as a baseband jamming signal or a baseband feedback signal, or other signal having a reduced frequency, that transmitter 110 may use to modulate a carrier wave signal (e.g., a jamming carrier wave signal or a feedback carrier wave signal) as may be the case where, for example, transmitter 110 is provided by an oscillator-based, e.g. superheterodyne, transmitter. The cancellation signal output may, in another example, include after application of a transfer function by cancellation signal processing circuit 120 a signal at a radio-frequency, e.g. a modulated carrier wave signal, which transmitter 110 may transmit to antenna 5 for emission. Transmitter 110 may transmit the cancellation signal by providing an output signal to antenna 5 for emission. The cancellation signal may be transmitted to a receiver node 20, 20-N, as described herein. Signal processing circuit 200 in one embodiment can include the functional signal processing circuit elements depicted in FIG. 1A, e.g. the circuits 105, 120, and 110. In one embodiment signal processing circuit 200 as set forth herein can include a subset of elements of the elements 105, 120, 110. In one embodiment, signal processing circuit 200 can include a subset of the signal processing circuit elements illustrated in FIG. 1A and be provided to work in combination with signal processing elements of a legacy signal processing circuit having remaining elements of the signal processing circuit elements illustrated in FIG. 1A.

Figure 1B:
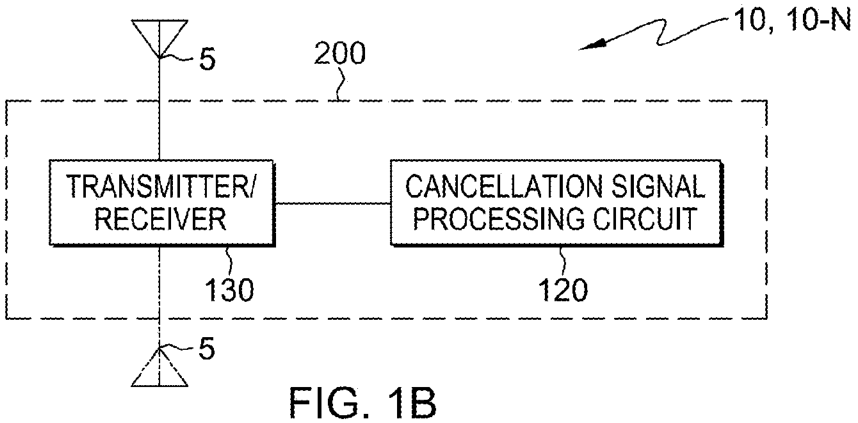
FIG. 1B is a functional block diagram of an alternative embodiment of a signal processing circuit of a node (apparatus) capable of simultaneously receiving a signal and transmitting a transformed signal, in which receiver and transmitter functions may share an antenna, in accordance with one or more aspects of the invention.

FIG. 1B is a functional block diagram of an alternative embodiment of a node (apparatus) 10, 10-N including a signal processing circuit 200. Similar to the embodiment of the node 10, 10-N of FIG. 1A, the alternative embodiment of node 10, 10-N in FIG. 1B includes a circuit capable of obtaining a signal picked up by antenna 5, performing at least one transformation on the signal, and transmitting the transformed signal, in accordance with one or more aspects set forth herein. The circuit may be a cancellation signal processing circuit 120. In this alternative embodiment, functional blocks for the receiver and transmitter are combined in a single transmitter/receiver (transceiver) functional block 130, illustrating that elements and functions of a receiver and transmitter may be shared, and may share a single antenna 5. Transmitter/Receiver 130 can be regarded as including a receiver 105 and a transmitter 110.

Figure 2:
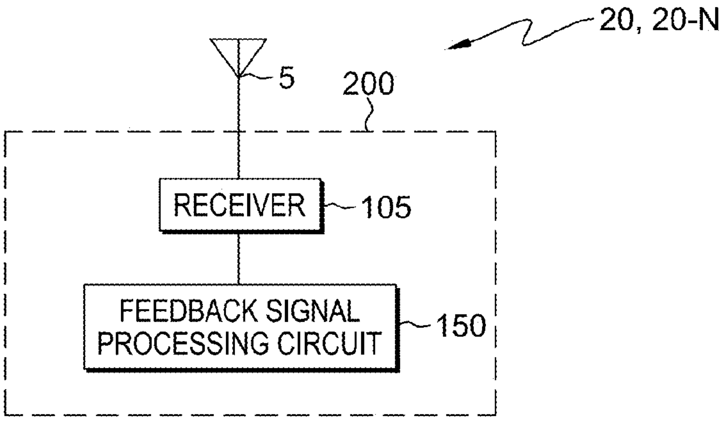
FIG. 2 is a functional block diagram of an embodiment of a signal processing circuit of a node capable of receiving one or more signals and processing the signals to generate at least one feedback signal, in accordance with one or more aspects of the invention.

FIG. 2 is a functional block diagram of an embodiment of a node 20, 20-N in the form of a signal processing circuit 200. Node 20, 20-N may generally be termed a "receiver node," and is capable of receiving one or more signals and generating at least one feedback signal, in accordance with one or more aspects as set forth herein. Node 20, 20-N, generally noted as node 20, is represented specifically as nodes 20-0, 20-1, etc. in FIGS. 4A-4D. In practice, node 20, 20-N may be a controlled node deployed in a location where it is intended to obtain signals from a transmission node (see FIGS. 4A-4D and description, below), but may be subject to one or more jamming signals that may interfere with the signals from the transmission node, and thus it may be desirable to protect the node from such jamming signals in order to obtain transmission signals. The protection may be provided by suppressing the jamming signals via a cancellation signal. Thus, signal processing circuit 200 of node 20, 20-N may include a receiver 105 and a feedback signal processing circuit 150. Receiver 105 may be coupled to an antenna 5, and may receive one or more signals, such as a transmission signal, a jamming signal, and/or a cancellation signal. It will be understood that receiver 105 of node 20, 20-N, in one embodiment, may perform a subset of functions in common with receiver 105 of node 10, 10-N, and a subset of functions not in common with receiver 105 of node 10, 10-N. Feedback signal processing circuit 150 can be a signal processing circuit that may function to generate one or more feedback signals. The feedback signal(s) may be based on one or more signals received via receiver 105 and output for processing by feedback signal processing circuit 150. In an exemplary embodiment, the feedback signal may be based on a jamming signal obtained via receiver 105. The feedback signal(s) may be transmitted, for example, to a STAR node 10, 10-N, as described herein. In one instance, feedback signal processing circuit 150 may be configured to process a jamming signal to determine one or more discrete portions of the jamming signal, so that the feedback signal includes the one or more discrete portions of the jamming signal. In another example, feedback signal processing circuit 150 may also process the jamming signal to determine a channel value, where the channel value may correspond to a channel between receiver node 20, 20-N and a jamming node 30, 30-N, as described below in FIGS. 4A-4D. The channel value may also be transmitted as part of a feedback signal, and may be transmitted to a STAR node 10, 10-N.

Figure 3A:
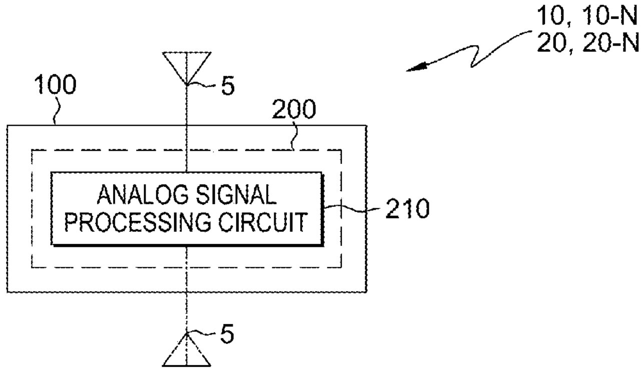
FIGS. 3A-3B are hardware schematic diagrams of exemplary embodiments of apparatuses including a signal processing circuit, in accordance with one or more aspects of the invention.

FIG. 3A is a hardware schematic diagram of one embodiment of apparatus 100 including a signal processing circuit 200. Apparatus 100 may be configured to be a STAR node 10, 10-N, as described functionally above, or may be configured to be a receiver node 20, 20-N, also as described functionally above. In the exemplary embodiment depicted, signal processing circuit 200 includes an Analog Signal Processing Circuit 210 (ASPC). ASPC 210 may be a signal processing circuit that includes one or more hardware components of an analog signal processor, such as an oscillator, mixer, modulator or de-modulator. ASPC 210 may also be coupled to one or more antennae 5. In the embodiment depicted in FIG. 3A, functions of each of the function blocks 105, 110, 120, 130 and/or 150 as depicted in FIG. 1A, 1B, or 2 may be performed by ASPC 210. For a STAR node 10, 10-N, ASPC 210 may be a circuit configured to obtain an analog signal, perform one or more signal processing transformations via analog signal processing components, for example de-modulation or amplification or phase-shifting, and transmit a processed analog signal. ASPC 210 may also be a circuit configured to determine a transfer function, as previously described above. ASPC 210 may thus include or be a cancellation signal processing circuit 120, as described in FIGS. 1A and 1B. For a receiver node 20, 20-N, ASPC 210 may be configured to obtain an analog signal, perform one or more signal processing transformations such as de-modulation, and generate one or more feedback signals. ASPC 210 may thus include or be a feedback signal processing circuit 130 as described in FIG. 2.

Figure 3B:
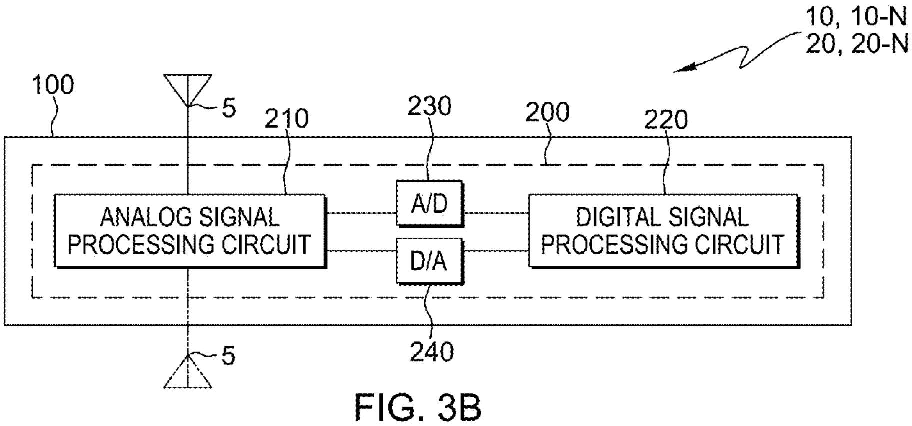

FIG. 3B is a hardware schematic diagram of an alternative embodiment apparatus 100 including a signal processing circuit 200, in which signal processing circuit 200 includes both a signal processing circuit in the form of an Analog Signal Processing Circuit 210 and a signal processing circuit in the form of a Digital Signal Processing Circuit 220 (DSPC). As with the embodiment depicted in FIG. 3A, apparatus 100 may be configured to be a STAR node 10, 10-N, as described functionally above, or may be configured to be a receiver node 20, 20-N, also as described functionally above. In the exemplary embodiment depicted, ASPC 210 may be configured to at least collect analog signals and make those signals available for processing, either within ASPC 210 or within DSPC 220. ASPC 210 may include hardware components for some signal processing, for example a hardware oscillator or a hardware de-modulator, but at a minimum can be capable of receiving an analog signal and passing that signal to other signal processing circuit 200 components. Regardless of what signal processing ASPC 210 performs, its output is an analog signal that may then be passed to an analog-to-digital (A/D) converter 230. The output of the A/D converter 230 is one or more digital information signals, which may then be passed to DSPC 220. In turn, DSPC may be configured to process, via one or more digital hardware or software components, the digital information signals. DSPC 220 may be configured to perform digitally any signal processing functions, such as modulation, de-modulation, filtering, amplification, and so on, whether or not such functions are handled via ASPC 210.

Generally, DSPC 220 may also be configured to perform one or more signal transformations. For a STAR node 10, 10-N, the signal transformation may include determination of a transfer function, as previously described. The transfer function may be chosen or configured to calculate a ratio of at least three frequency-dependent channels, and may further include additional variable dependencies, such as a time-delay variable function. The transfer function may be used by DSPC 220 to determine an appropriate cancellation signal. In the embodiment of FIG. 3B, the functions of function blocks 105, 110, 120, 130, and/or 150 as depicted in FIG. 1A, 1B, or 2 may be performed by any designed division of labor scheme between ASPC 210 and DSPC 220 as depicted in FIG. 3B. Thus, in one example, DSPC 220 may be a circuit including a cancellation signal processing circuit. In another example, DSPC 220 may be a circuit including a feedback signal processing circuit.

The output of DSPC 220, whether apparatus 100 is a STAR node 10, 10-N or a receiver node 20, 20-N, may be a digital information signal, which may then be passed to a digital-to-analog (D/A) converter 240. The D/A converter 240 converts digital information into analog signal form, which may then be passed to one or more components of ASPC 210. ASPC 210 may perform additional signal processing, such as amplification or modulation of a signal into a carrier wave signal, but at a minimum ASPC 210 may forward a signal to an antenna 5 for signal emission. The signal transmitted and emitted may be a cancellation signal (e.g., as may be output by a STAR node) or a feedback signal (e.g., as may be output by a receiver node).

Figure 3C:
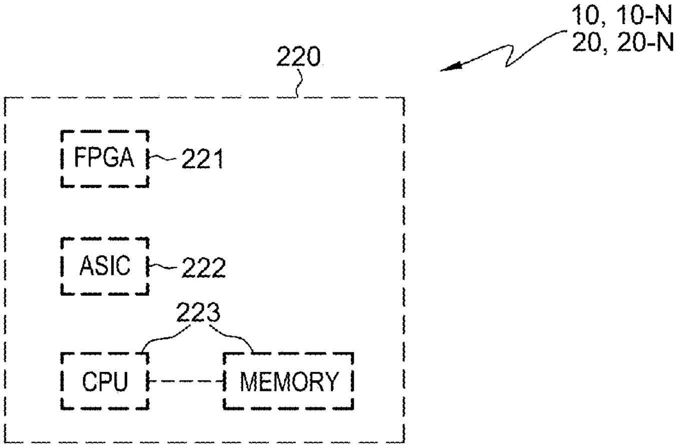
FIG. 3C depicts example embodiments of one or more components that may be included as part of a digital signal processing circuit as depicted by FIG. 3B, in accordance with one or more aspects of the invention.

FIG. 3C illustrates exemplary embodiments of a Digital Signal Processing Circuit 220, as may be implemented in one or more embodiments of apparatus 100 depicted in FIG. 3B. DSPC 220 can include, in one embodiment, one or more of a field programmable gate array (FPGA) 221, an application-specific integrated circuit (ASIC) 222, or a processor system 223 comprising a central processing unit (CPU) with a memory, each depicted in dashed form to highlight that each is an optional component. In each case, there may be a plurality of such components present in DSPC 220. An FPGA 221, if present, may further be coupled with a memory to allow for pre-configuration of one or more processing functions. An FPGA 221 and/or ASIC 222, if present, may include a processor system provided in the manner of processor system 223. DSPC 220 may also include other circuit digital signal processing components external to an FPGA 221, ASIC 222, and/or processor system 223.

Figure 4A:
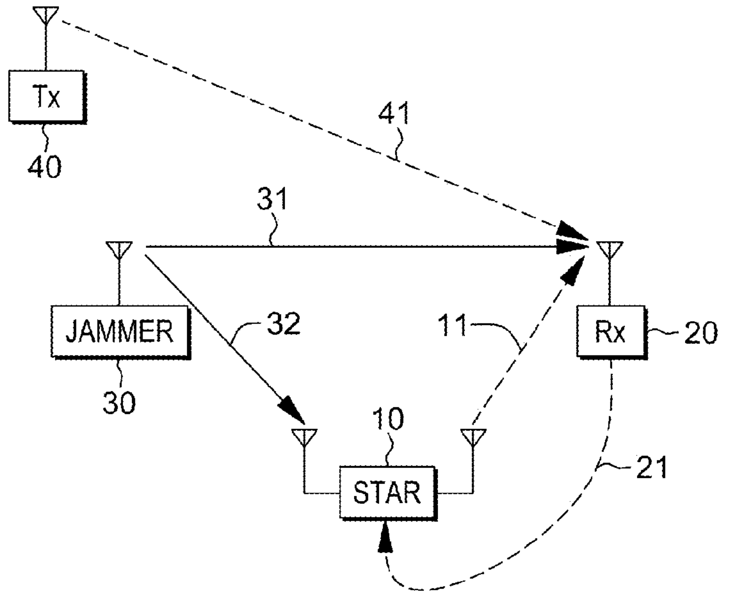
FIG. 4A depicts an embodiment of a system including a receiver node and a STAR node, in relation to a jamming node and transmission node, illustrative of how a STAR node may be deployed to cancel jamming signals at a receiver node, in accordance with one or more aspects of the invention.

FIG. 4A depicts a schematic of an embodiment of a system including a STAR node 10 and a receiver node 20, in relation to other nodes, to illustrate generally how a STAR node 10 may be used to cancel a jamming signal. Receiver node 20 may be positioned and configured to obtain a transmission signal 41 from a transmitter node 40. Receiver node 20 may also be positioned near a jamming node 30 broadcasting a jamming signal 31 that may be designed to interfere with transmission signal 41 in one or more ways at receiver node 20. Jamming node 30 may be understood, in general, to not be under the control of any entity controlling either transmitter node 40 or receiver node 20. STAR node 10 may be positioned and configured so that it can obtain a jamming signal 32 from jamming node 30. STAR node 10 may be further positioned and configured to obtain a feedback signal 21 from receiver node 20 and transmit a cancellation signal 11 to receiver node 20. Cancellation signal 11 may, ideally, be able to completely suppress jamming signal 31 at the receiver node 20, prior to any signal processing that may occur within receiver node 20, so that transmission signal 41 may be obtained and processed without interference from jamming signal 31. In most practical applications, it may not be possible to completely suppress jamming signal 31, depending the positioning of STAR node 10 and the speed with which STAR node 10 can successfully calculate and generate a cancellation signal. However, cancellation signal 11 may provide sufficient suppression of jamming signal 31, so as to effectively reduce the power of jamming signal 31 at receiver node 20 prior to receiver node 20 performing any signal processing, so that transmission signal 41 may still be obtained and processed clearly by receiver node 20 with jamming signal 31 reduced to an insignificant level of "noise."

It should be understood that FIG. 4A depicts only one example of using a STAR node 10 to protect a receiver node 20 from a jamming signal, and is not drawn to illustrate actual physical placements or distances. In addition, it should be understood that FIG. 4A depicts an example in which each of the illustrated nodes is assumed to be stationary. In alternative embodiments, one or more of the illustrated nodes may be a moving node, such as a node that is attached to or integrated with a vehicle. For example, transmitter node 40 may be stationary while receiver node 20 may be mounted in a first aircraft. Jamming node 30 may be stationary as well, such as a hostile base station transmitting jamming signals, and may be in an area through which the aircraft is traveling. STAR node 10 may also be mounted in a second aircraft in this example, and the second aircraft may be deployed to remain in or around the vicinity of jamming node 30 in order to successfully obtain jamming signal 32 and broadcast a cancellation signal 11 to the receiver node 20 mounted in the first aircraft. The arrangement of STAR node 10 and receiver node 20 may allow, for example, the first aircraft to obtain transmission signals 41 as if jamming node 30 were not present.

Figure 4B:
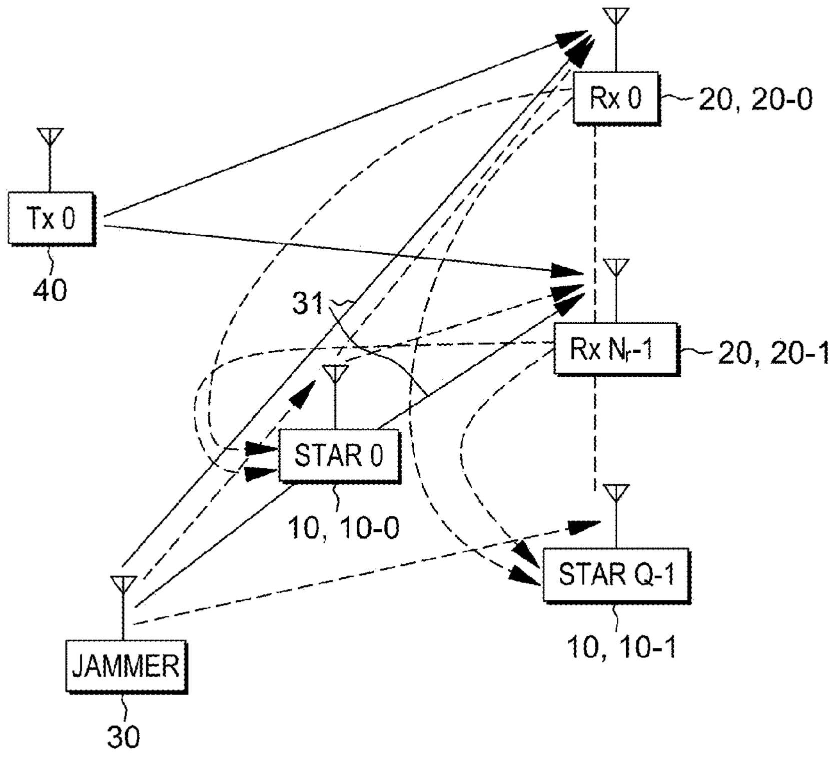
FIG. 4B depicts an embodiment of a system similar to the system of FIG. 4A, in which the system includes multiple STAR nodes and multiple receiver nodes, in accordance with one or more aspects of the invention.

In many situations, there may be multiple jamming signals to be suppressed, there may be multiple receiver nodes requiring protection from one or more jamming nodes, and/or multiple STAR nodes may be used to suppress multiple jamming nodes and protect multiple receiver nodes. FIG. 4B, for instance, illustrates an exemplary case in which a single jamming node 30 is sending jamming signals 31 to multiple receiver nodes 20, 20-0 and 20, 20-1. Multiple STAR nodes 10, 10-0 and 10, 10-1 may be deployed to suppress the jamming signals 351. In the example shown, the number of STAR nodes is equal to the number of receiver nodes being protected; however, in alternative examples, the number of STAR nodes may exceed the number of receiver nodes to be protected, as increasing the number of STAR nodes may improve the level of suppression of jamming signals 31.

Figure 4C:
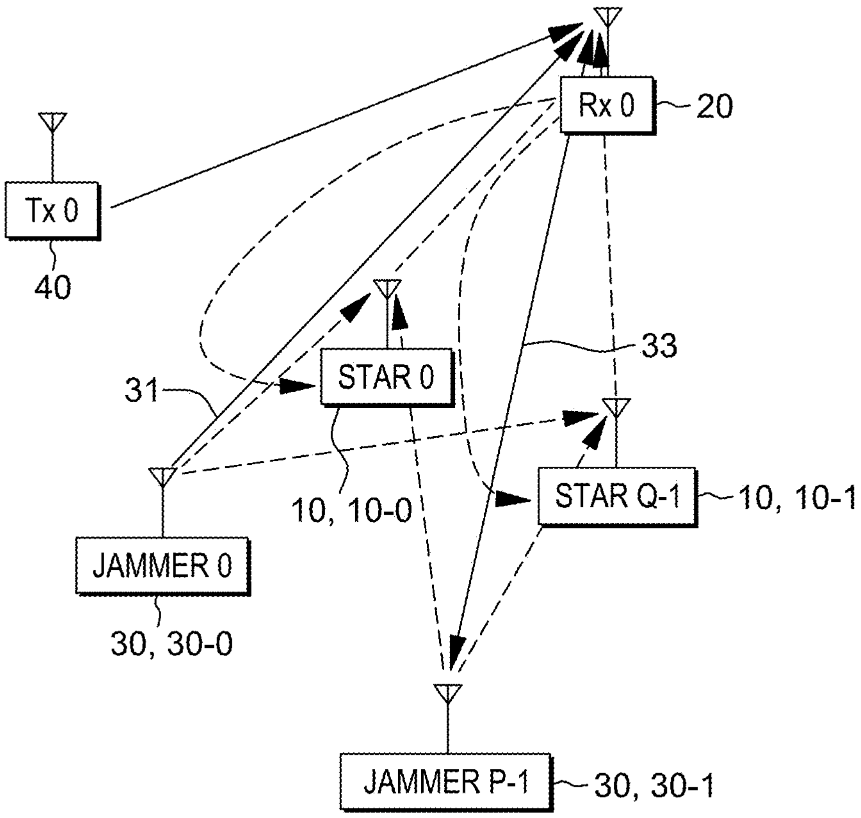
FIG. 4C depicts an embodiment of a system similar to the system of FIG. 4A, in which the system includes multiple STAR nodes in the presence of multiple jamming nodes, in accordance with one or more aspects of the invention.
Figure 4D:
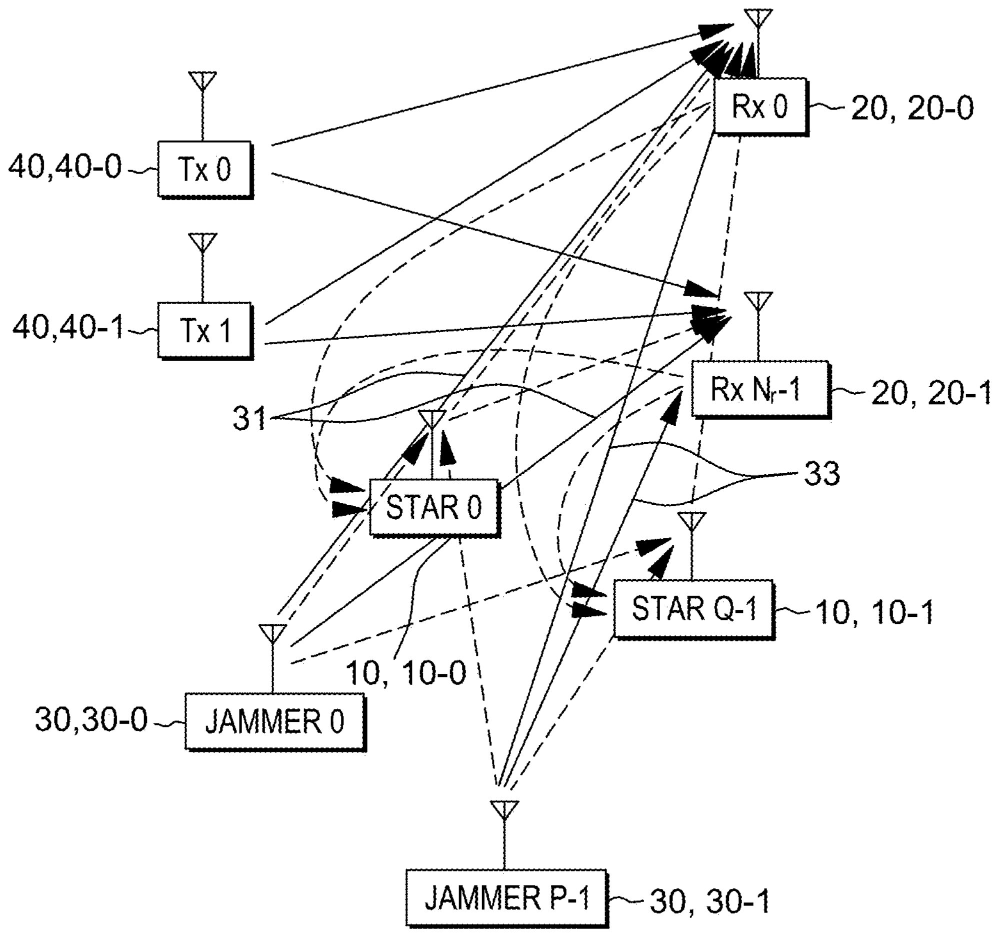
FIG. 4D depicts an embodiment of a system similar to the systems of FIGS. 4B and 4C, in which the system includes multiple STAR nodes and multiple receiver nodes that are deployed in the presence of multiple jamming nodes, in accordance with one or more aspects of the invention.

FIG. 4C, by way of further example, illustrates an alternate case in which multiple jamming nodes 30, 30-0 and 30, 30-1 are transmitting multiple jamming signals 31 and 33, which are picked up by a single receiver node 20. These multiple jamming signals 31 and 33 may have different properties, such as different bandwidths and frequencies. Again, multiple STAR nodes 10, 10-0 and 10, 10-1 may be deployed to suppress jamming signals 31 and 33. Here the number of STAR nodes 10 at least equals the number of jamming nodes 30, but may alternatively exceed the number of jamming nodes. FIG. 4D, finally, illustrates another exemplary case in which multiple jamming nodes 30, 30-0 and 30, 30-1 and multiple receiver nodes 20, 20-0 and 20, 20-1 can be accounted for, and in which multiple STAR nodes 10, 10-0 and 10, 10-1 are deployed. As a general guideline, when a system involves N receiver nodes in the presence of M jamming nodes, jamming signal suppression may be best achieved by deploying at least N or M STAR nodes, whichever of N or M is greater, and suppression may be improved by deploying more STAR nodes than the minimum number. FIG. 4C further illustrates an example in which multiple transmitter nodes 40, 40-0 and 40, 40-1 may be sending signals to be obtained at multiple receiver nodes 20, 20-0 and 20, 20-1.

Figure 5A:
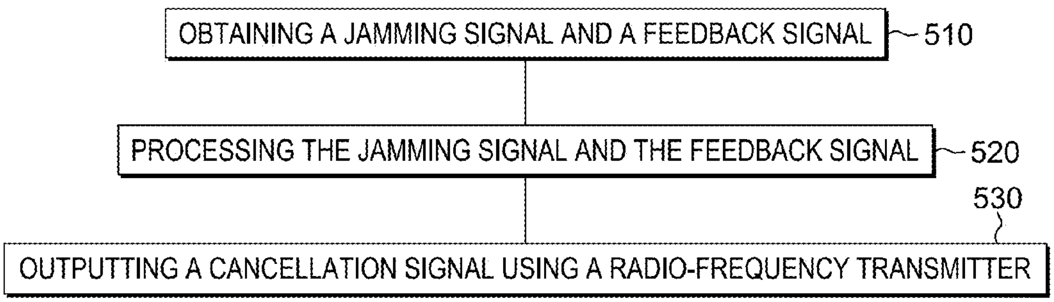
FIG. 5A is a block diagram depicting an exemplary embodiment of a method of suppressing a jamming signal, in accordance with one or more aspects of the invention.

FIG. 5A is a process flow diagram illustrating a method of cancelling a jamming signal, according to one or more embodiments. FIG. 5A illustrates a method that may be performed by cancellation signal processing circuit 120 of a STAR node 10, 10-N. A jamming signal and a feedback signal at block 510 can be obtained from a radio-frequency receiver 105, 130 (receiver) of signal processing circuit 200. In one example, the jamming signal and/or feedback signal may be obtained from receiver 105, 130 as a radio-frequency signal. A radio-frequency signal may be, in one example, a signal that has not undergone filtering, amplification, or other signal processing or transformation by receiver 105, 130 prior to being obtained from receiver 105, 130. A radio-frequency signal may also be, in another example, a signal that has been subjected to filtering and/or amplification by receiver 105, 130, but may not be de-modulated by receiver 105, 130, prior to being obtained from receiver 105, 130. In another example, the jamming signal and/or feedback signal may be obtained from receiver 105, 130 as a baseband signal or other signal having a reduced frequency (e.g., an intermediate frequency signal) that may include a representation of a carrier wave signal, such as a jamming carrier wave signal or a feedback carrier wave signal. Receiver 105, 130 can be configured to receive the jamming signal and the feedback signal using an antenna 5 that may be coupled to receiver 105, 130 as depicted in FIGS. 1A and 1B, and can be configured to output a jamming signal and feedback signal to cancellation signal processing circuit 120. In one example, the feedback signal may be received by receiver 105, 130 from a receiver node 20, 20-N, and the jamming signal may be received by receiver 105, 130 from one or more jamming nodes 30, 30-N, as may be depicted by, for example, FIGS. 4A through 4D. The jamming signal and feedback signal may be processed by cancellation signal processing circuit 120 at block 520, to determine a cancellation signal. The processing may be carried out by a circuit capable of determining a cancellation signal. The cancellation signal can be output at block 530. Cancellation signal processing circuit 120 can output a cancellation signal to radio-frequency transmitter 110, 130 (transmitter) of signal processing circuit 200 of STAR node 10, 10-N. In one example, outputting the cancellation signal from cancellation signal processing circuit 120 may include outputting, after application of a transfer function by cancellation signal processing circuit 120, a signal at a radio-frequency, e.g. a modulated carrier wave signal. In another example, outputting the cancellation signal from cancellation signal processing circuit 120 may include outputting, after application of a transfer function by cancellation signal processing circuit 120, a baseband signal or other signal having a reduced frequency that transmitter 110, 130 may use to modulate a carrier wave signal. Transmitter 110, 130 in turn can transmit the cancellation signal for emission by antenna 5 that may be coupled to transmitter 110, 130 as depicted in FIGS. 1A and 1B. Such a cancellation signal can be received at a receiver node 20, 20-N, as set forth herein.

Figure 5B:
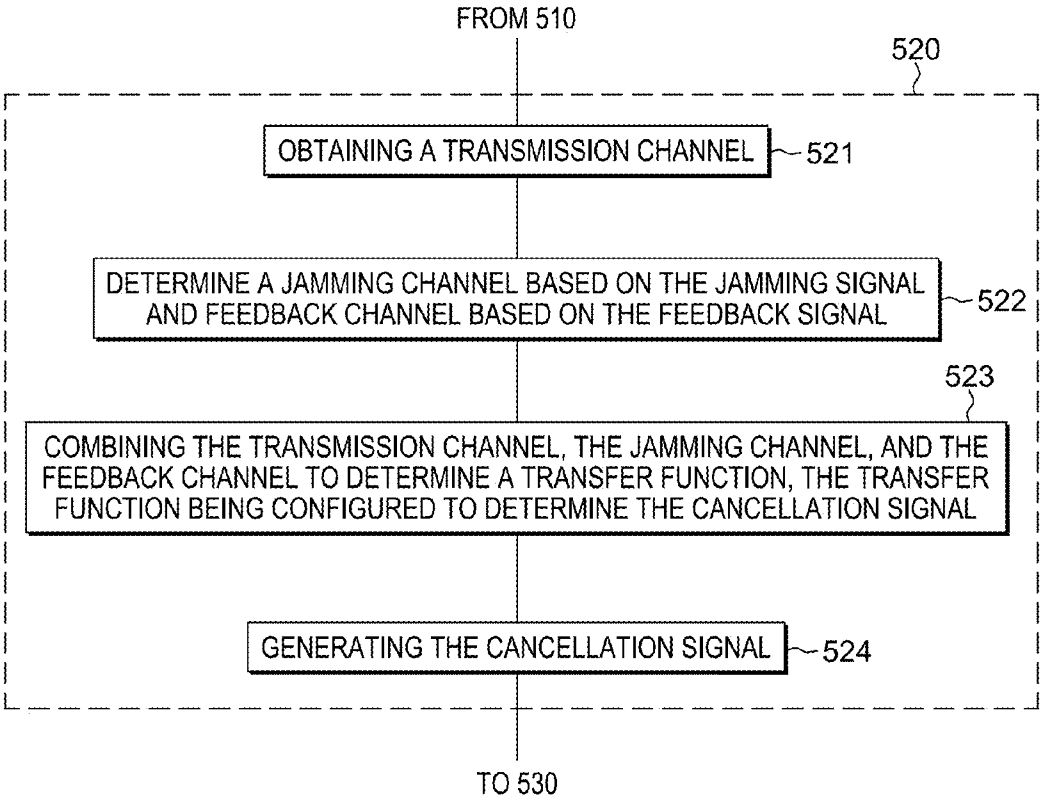
FIG. 5B is a block diagram depicting a portion of the method of FIG. 5A, detailing further the method of FIG. 5A of suppressing a jamming signal, in accordance with one or more aspects of the invention.

FIG. 5B is a process flow diagram illustrating additional elements that may be included in the processing of the jamming signal and feedback signal by cancellation signal processing circuit 120, at block 520. Processing may include obtaining a transmission channel, at block 521. As described herein, the transmission channel may correspond to a channel between a receiver node 20, 20-N and a jamming node 30, 30-N. A jamming channel, based on the obtained jamming signal, and a feedback channel, based on the obtained feedback signal, are also determined, at block 522. The jamming channel may correspond to a channel between STAR node 10, 10-N and jamming node 30, 30-N, and the feedback channel may correspond to a channel between STAR node 10, 10-N and receiver node 20, 20-N. The transmission channel, jamming channel, and feedback channel may be combined to determine a transfer function, in which the transfer function is configured to determine a cancellation signal that may suppress the jamming signal, at block 523. The cancellation signal may, in part, include an inverse of the jamming signal being obtained at signal processing circuit 200 of the STAR node 10, 10-N. Determination of the transfer function may ideally be carried out in signal processing circuit 200 at the STAR node 10, 10-N. The cancellation signal, once determined, is generated, at block 524. The generated cancellation signal may then be output, as described in block 530 of FIG. 5A.

Ideally, the cancellation signal may arrive at the receiver node 20, 20-N in synch with the jamming signal, so that the cancellation signal and jamming signal cancel each other completely at the receiver node 20, 20-N. The cancellation signal may cancel the jamming signal at an antenna 5 of receiver node 20, 20-N, depicted in FIG. 2. Thus, the jamming signal may be completely suppressed by the cancellation signal without either signal being processed by receiver node 20, 20-N, which may permit a transmitted signal from a transmission node 40 to be received clearly at receiver node 20, 20-N. In practice, the cancellation signal may not arrive completely in synch with the jamming signal; the cancellation signal may thus not completely suppress the jamming signal, but may instead suppress a portion of the jamming signal. The suppression provided by the cancellation signal may sufficiently suppress the jamming signal power so that the jamming signal may be an insignificant contribution to the total signal obtained at the receiver node 20, 20-N. Effectively, if the suppression of the jamming signal is sufficiently high, the receiver node 20, 20-N can obtain and process the intended transmission signal approximately as if the jamming signal were not present.

The methods outlined above in FIGS. 5A and 5B may, in alternative embodiments, be adapted or modified with additional parameters to account for additional variables in practice. For example, the method described above may be applied if, for instance, the STAR node 10, 10-N is placed in or near the direct line path between the jamming node 30, 30-N and the receiver node 20, 20-N; in such an example, the difference in arrival time at the receiver node 20, 20-N between the jamming signal and the cancellation signal may be close to zero. However, in many cases the difference in arrival time is not nearly zero, such as in cases where the receiver node 20, 20-N or STAR node 10, 10-N is not stationary, or in cases where it is not possible to place the STAR node 10, 10-N in a direct line path between the jamming node 30, 30-N and the receiver node 20, 20-N. An example of such an arrangement is illustrated in FIG. 4A. In such cases, there may be a non-negligible delay time t, which may be accounted for by including a delay function as part of determining the transfer function. The delay time t may be defined as the difference between a time $t_1$, the time of receiving the jamming at the STAR node 10, 10-N and transmitting the cancellation signal to the receiver node 20, 20-N, and a time $t_2$, the time of receiving the jamming signal at receiver node 20, 20-N. As described above, such time delay differences may not allow for full suppression of a jamming signal, and accounting for time delays may result in suppression of a portion of the jamming signal rather than complete suppression.

The method described in FIGS. 5A and 5B may also apply if, for instance, a single feedback signal is transmitted from the receiver node 20, 20-N to the STAR node 10, 10-N, in which the feedback signal includes a portion of the jamming signal obtained by the receiver node 20, 20-N. In other examples, it may be advantageous to obtain several feedback signals at the STAR node 10, 10-N, in which each feedback signal includes some portion of the jamming signal, and for signal processing circuit 200 of STAR node 10, 10-N to iteratively estimate the transmission channel between the jamming node 30, 30-N and the receiver node 20, 20-N based on the multiple feedback signals. By increasing the number of samples of the jamming signal sent from the receiver node 20, 20-N to the STAR node 10, 10-N, the STAR node may be able to more closely and accurately estimate the transmission channel between the jamming node 30, 30-N and the receiver node 20, 20-N, and thus determine a more accurate cancellation signal. Other exemplary embodiments of the method described by FIG. 5A and FIG. 5B may also incorporate additional parameters and additional calculations to the transfer function in order to most accurately determine the cancellation signal that will best suppress or cancel a jamming signal.

Further details of a STAR node for suppressing jamming signals, according to one or more embodiments described herein, as well as one or more embodiments of methods for using a STAR node for suppressing jamming signals, according to one or more embodiments described herein, are set forth below. Referring again to FIG. 4A, STAR node 10, 10-N may be used to protect a receiver node 20,20-N from jamming from jamming node 30, 30-N. The signal 31 from jammer 30, 30-N arrives at receiver node 20, 20-N through a channel $G_{RJ}(f)$. STAR node 10, 10-N receives signal 32 from the jammer 30, 30-N without significant contribution from the desired transmitter node 40. The STAR node 10, 10-N may apply a transfer function W(f), then the retransmitted signal passes through a channel $G_{RS}(f)$ between STAR node 10,10-N and receiver node 20,20-N. The total transfer function between jammer 30,30-N and receiver node 20,20-N is:

$$H_{RJ}(f)=G_{RJ}(f)+G_{SJ}(f)W(f)G_{RS}(f) \tag{1}$$

Many solutions may be possible for the transfer function. For simplicity, it may be assumed, for instance, that the receiver node 20,20-N is able to provide feedback to node 10,10-N, and that STAR node 10,10-N can adjust W(f) so that:

$$W(f) = -\frac{G_{RJ}(f)}{G_{SJ}(f)G_{RS}(f)} \tag{2}$$

Then $H_J(f)=0$, and receiver node 20,20-N can receive the signal 41 from the desired transmitter node 40 as if the jamming signal 31 from jammer node 30,30-N were not present.

It is not necessary for STAR node 10,10-N to be remotely separated from protected receiver node 20,20-N in all embodiments. As discussed further herein, for a separation as small as 102, STAR node 10,10-N can cancel jamming signal 31 from jammer 30,30-N while having no detrimental impact on the link between the desired transmitter node 40 and the protected receiver node 20,20-N as long as the angular separation between the STAR node 10,10-N and the desired transmitter node 40 is greater than about 10.5°. For a 10002 separation between STAR node 10,10-N and receiver node 20,20-N, the required angular spacing between the desired transmitter node 40 and the jammer 30,30-N may be about 1.1°. Several advantages may be realized in such exemplary embodiments. For example, the delay between the jammer-STAR node-receiver node path and the jammer-receiver node path can be kept very small, leading to large bandwidth. As well, feedback between the protected receiver node 20,20-N and the STAR node 10,10-N can be performed over a wired link. In such an embodiment, because the cancellation occurs in an internal circuit rather than over the air, delay can be placed in the direct jammer-receiver node path prior to cancellation, allowing the differential delay to be further reduced. Further, the channel between the AJ-STAR node 10,10-N and the receiver node 20,20-N can be fixed, or nearly fixed, minimizing the feedback rate and the required update rate for channel estimates. Additionally, such a deployment geometry may be preferable for satellites and aircraft for which it is not possible to operate a remote, separate STAR node 10,10-N in a coordinated motion.

Referring again to FIG. 4A, in another embodiment STAR node 10,10-N may be operating under the constraint that STAR node 10,10-N can only apply a single complex weight to the signal 11 as it retransmits it. It may be assumed that the aggregate STAR path, including signal path 32, STAR node 10, 10-N and signal path 11, has a delay τ relative to the direct path 31 and that the STAR node 10,10-N applies a single complex weight $$W(f)=w^* \tag{3}$$

The weight w may be set so that $H_{RJ}(f_0)=0$ at some frequency $f_0$:

$$H_{RJ}(f_0) = G_{RJ}(f_0) + G_{SJ}(f_0)w^*G_{RS}(f_0) = 0 \tag{4}$$

$$w^* = -\frac{G_{RJ}(f_0)}{G_{SJ}(f_0)G_{RS}(f_0)}e^{j2\pi f_0\tau}$$

This results in:

$$H_{RJ}(f) = G_{RJ}(f) - G_{RJ}(f_0)\frac{G_{SJ}(f)G_{RS}(f)}{G_{SJ}(f_0)G_{RS}(f_0)}e^{j2\pi(f_0-f)\tau} \tag{5}$$

If the channels are frequency-flat, so that $G_{SJ}(f)=G_{SJ}(f_0)$, $G_{RS}(f)=G_{RS}(f_0)$, and $G_{RJ}(f)=G_{RJ}(f_0)$, then $$H_{RJ}(f)=G_{RJ}(f_0)(1-e^{j2\pi(f_0-f)\tau}) \tag{6}$$

and $$|H_{RJ}(f)|^2=4|G_{RJ}(f_0)|^2|\sin(\pi(f-f_0)\tau|^2 \tag{7}$$

This transfer function has a null at frequency $f_0$ with a width that is related to $1/\tau$. Thus, with a single tap, the bandwidth of effective cancellation is determined, limited by the delay through the STAR node 10,10-N.

For a frequency flat jammer 30,30-N, the total jamming response is:

$$\begin{aligned} P_{RJ,AJ-STAR} &= \int_{-B/2}^{B/2} P_J(f)|H_{RJ}(f)|^2\,df \\ &= 2BP_J(f_0)|G_{RJ}(f_0)|^2\left(1-\frac{\sin(\pi B\tau)}{\pi B\tau}\right) \end{aligned} \tag{8}$$

The jamming signal that would have been received at receiver node 20,20-N without the AJ-STAR node 10,10-N is:

$$\begin{aligned} P_{RJ} &= \int_{-B/2}^{B/2} P_J(f)|G_{RJ}(f)|^2\,df \\ &= BP_J(f_0)|G_{RJ}(f_0)|^2 \end{aligned} \tag{9}$$

Thus, for the frequency-flat channel, and single-tap AJ-STAR node 10,10-N, the suppression provided is:

$$S_{AJ-STAR} = \frac{P_{RJ}}{P_{RJ,AJ-STAR}} = \frac{1}{2}\left(1-\frac{\sin(\pi B\tau)}{\pi B\tau}\right)^{-1} \tag{10}$$

If the filter W(z) has multiple taps, suppression can be achieved across a wider bandwidth. The use of multiple taps, however, may increase the group delay of the filter W(z) so that the total delay on the jammer-STAR node-receiver node path is significantly larger than the jammer node-receiver node path; as a result, the bandwidth of the solution may be limited.

It may be observed that if $G_{SJ}(z)G_{RS}(z)$ has a bulk delay of D samples that is greater than the delay in $G_{RJ}(z)$, then in order to completely cancel out the jamming signal at receiver node 20,20-N, STAR node 10,10-N would need a non-causal D-sample advance, which may not realizable in embodiments in which jamming node 30, 30-N produces a non-periodic jamming signal. This implies that the delay associated with propagation channels $G_{SJ}(z)G_{RS}(z)$, combined with the delay through the STAR node W(z), cannot be significant relative to the delay of the path $G_{RJ}(z)$, where significance is defined relative to the inverse of the protection bandwidth. If the jamming bandwidth is significant relative to the inverse of the difference in the propagation delay between the direct path, $G_{RJ}(z)$, and the aggregate STAR node path $G_{SJ}(z)G_{RS}(z)W(z)$, then the STAR node 10,10-N should be placed as closely as possible to the direct line between the jammer node 30,30-N and the protected receiver node 20,20-N in order to minimize the differential path delay and maximize protection bandwidth. Additionally, since the minimum latency through the STAR node 10,10-N affects the delay through the aggregate path, the delay through the STAR node 10,10-N ideally may kept as small as possible.

If the difference in delay between the direct path 31 and the STAR node path 32, 10, and 11 is limited to $\tau_{max}$, then STAR node 10,10-N may be ideally located within an ellipsoid, where the ellipsoid has one focus at the protected receiver node 20,20-N and a second focus at jammer node 30,30-N. The minor axis size (diameter) of the ellipsoid is given by:

$$2b=\sqrt{2Rc\tau_{\max}+c^2\tau_{max}} \tag{11}$$

For example, for a bandwidth of 100 kHz, if a suppression of 34 dB is desired using a single tap, then the maximum value of $\tau_{max}$ is 100 ns. If the desired range is 40 km, then the major axis length is approximately 1.1 km.

In embodiments using multiple STAR nodes 10, 10-N, such as embodiments illustrated in FIGS. 4B-4D, any one STAR node 10, 10-N may be in motion and may follow a path that takes the one STAR node 10, 10-N temporarily outside of an ellipsoid as described above. Because multiple STAR nodes 10, 10-N may be used, however, any one or more STAR nodes 10, 10-N within the defined ellipsoid area may be used to apply suppression to jamming signals 31, 33, even if one or several other STAR nodes 10, 10-N are temporarily moving outside the ellipsoid. This may be the case, for example, if STAR nodes 10, 10-N are deployed, for instance, on moving vehicles or aircraft.

In some embodiments, the jamming signal from jamming node 30, 30-N may include predictable or repeating waveform components, in which case STAR node 10, 10-N may be able to analyze and synthesize these waveform components within one or more of receiver 105, transmitter 110, and/or cancellation signal processing circuit 120. In such embodiments, the need to minimize latency through STAR node 10, 10-N may be eliminated or mitigated because STAR node 10, 10-N can reliably reproduce the predictable waveform components of the jamming signal. For example, jamming node 30, 30-N may employ a pseudo-random sequence as a component of a jamming signal. STAR node 10, 10-N may be configured to receive and analyze the pseudo-random sequence in order to reproduce the matching cancellation signal at any time without the need to rapidly receive, analyze, and re-transmit the jamming waveform "on the fly."

Referring again to FIG. 4A, in one example embodiment each of channels $G_{SJ}(z)$, $G_{RS}(z)$, $G_{RJ}(z)$, and W(z) may be causal, stable, linear time invariant filters. In such an embodiment, $$H_{RJ}(z)=G_{RJ}(z)+W(z)G_{SJ}(z)G_{RS}(z) \tag{12}$$

It may be assumed that the power of the desired signal component received at STAR node 10,10-N is small relative to the power of the signal received from the jammer 30,30-N, or alternatively, that the desired transmitter node 40 power is "blanked" or turned off during the period over which measurements are made to compute the STAR weights. As described previously, it may be necessary to include a period in which the unmitigated jammer 30,30-N is allowed to arrive at the receiver node 20,20-N in order to obtain the measurements needed. The desired transmitter node 40 can be blanked during this period without loss of communication capacity (assuming that the jammer 30,30-N would have prevented the link from operating during this period). This process, as further described below, may be termed a "one step" process because a suppression signal may be determined through one set of computations rather than through repeated and iterative calculations, as in the "adaptive" process described further herein.

The signal received at the protected receiver node 20,20-N via the STAR node 10,10-N is given by:

$$r_{RS,n} = \begin{cases} \sum_{l=0}^{L-1} \sum_{l'=0}^{L'-1} \sum_{l''=0}^{L''-1} w_l^* g_{RS,l'} \begin{pmatrix} g_{SJ,1''} s_{J,n-l-l'-l''} + \\ g_{SD,l''} s_{D,n-l-l'-l''} + n_{S,n} \end{pmatrix} & \text{No blanking} \\ \sum_{l=0}^{L-1} \sum_{l'=0}^{L'-1} \sum_{l''=0}^{L''-1} w_l^* g_{RS,l'} (g_{SJ,1''} s_{J,n-l-l'-l''} + n_{S,n}) & \text{With blanking} \end{cases}$$
$$= \sum_{l=0}^{L-1} w_l^* s_{S,n-l} + \sum_{l=0}^{L-1} \sum_{l'=0}^{L'-1} w_l^* g_{RS,l'} n_{S,n} \tag{13}$$

where $s_{S,n}$ is the signal that would be received at the protected receiver node 20,20-N if the STAR node 10,10-N applied a pass-through filter:

$$s_{S,n} = \begin{cases} \sum_{l'=0}^{L'-1} \sum_{l'=0}^{L''-1} g_{RS,l'} (g_{SJ,l'} s_{J,n-l-l'-l''} + g_{SD,l'} s_{D,n-l-l'-l''}) & \text{No Blanking} \\ \sum_{l'=0}^{L'-1} \sum_{l''=0}^{L''-1} g_{RS,l''} g_{SJ,l'} s_{J,n-l-l'-l''} & \text{With blanking} \end{cases} \tag{14}$$

The signal received directly from the jammer 30,30-N is $$r_{RJ,n} = \sum_{l=0}^{L-1} g_{RJ,l} s_{J,n-l} \tag{15}$$

and the signal received directly from the desired transmitter node 40 is $$r_{RD,n} = \sum_{l=0}^{L-1} g_{RD,l} s_{D,n-l} \tag{16}$$

The signals received at the protected node during a window of N samples via the STAR node 10,10-N can be collected in a vector:

$$r_{RS} = [r_{RS,0} \ldots r_{RS,N-1}] = w^H S_S \tag{17}$$

where $$S_S = \begin{bmatrix} s_{S,0} & \ldots & s_{S,N-1} \\ \vdots & \ddots & \vdots \\ s_{S,-L+1} & \ldots & s_{S,N-L} \end{bmatrix} \tag{18}$$

and the samples received via the direct jammer-to-receiver node and desired transmitter-to-receiver node paths are $$r_{RJ} = [r_{RJ,0} \ldots r_{RJ,N-1}] \tag{19}$$

$$r_{RD} = [r_{RD,0} \ldots r_{RD,N-1}] \tag{20}$$

A cost function representing the total residual power of the jamming signal after cancellation can be defined as:

$$J(w) = \|r_{RS} + r_{RJ}\|^2 = \|w^H S_S + r_{RJ}\|^2 \tag{21}$$

The gradient of this cost function is $$\begin{aligned} \nabla J(w) &= 2S_S S_S^H w + 2S_S r_{RJ}^H \\ &= 2S_S (S_S^H w + r_{RJ}^H) \end{aligned} \tag{22}$$

Finding where the gradient of the cost function, (EQ. 22) is zero results in:

$$w_{opt} = -(S_S S_S^H)^{-1} S_S r_{RJ}^H \tag{23}$$

The formulation of equation 23 may present a challenge because it requires a measure of the jamming signal, $r_{RJ}$, at the receiver node 20,20-N to be protected without either the contribution from the STAR node path, $r_{RS}$, or the contribution from the desired transmitter node 40, $r_{RD}$. Thus, an optimal STAR update, as formulated in EQ. 23, may require periodic "uncovering" of the jammer 30,30-N to allow measurement of $r_{RJ}$ at the protected receiver node 20,20-N. Legacy waveforms may not have a suitable period for uncovering, which can leave the signal vulnerable to jamming. If the calculations are performed at STAR node 10,10-N, it may not be necessary to send all samples of $r_{RJ}$ to STAR node 10,10-N. Only enough samples need to be sent to update the weights and meet the SNR requirements during a period over which the channel $G_{RJ}$ is stationary.

The value of $w_{opt}$ in EQ. 23 may be computed at either the protected receiver node 20,20-N or the STAR node 10,10-N. If it is calculated at the protected receiver node 20,20-N; a measure of the signal for the direct path from the jammer 30,30-N to the protected receiver node 20,20-N may be required, which may be obtained by turning the STAR node 10,10-N off, and a measure of $S_s$ may be required, which one can measure at the protected receiver node 20,20-N by setting $w_{q,l} = \delta(l)$.

At STAR node 10,10-N, the signal from the jammer 30,30-N may be measured $$r_{S,n} = \begin{cases} \left(\sum_{l=0}^{L-1} g_{SJ,l} s_{J,n-l} + g_{SD,l} s_{D,n-l}\right) + n_{S,n} & \text{No blanking} \\ \left(\sum_{l=0}^{L-1} g_{SJ,l} s_{J,n-l}\right) + n_{S,n} & \text{With blanking} \end{cases} \tag{24}$$

and the result may be convolved with the estimate of the channel between the STAR node 10,10-N and the protected receiver node 20,20-N.

In practice, the "one step" process described herein may be implemented by sending an interval of $M_{int}$ samples. During each interval, STAR node 10,10-N turns off its re-transmission of the jamming signal for the "uncovering" portion, lasting $N_{uc}$ samples of every interval. In this example, the desired transmitter node 40 emits during the protection period, and blanks its signal during the uncovering period and the probe period, permitting direct measurement of $r_{RJ}$ at the protected receiver node 20, 20-N. During the $N_{uc}$ samples of the uncovering period for interval m, receiver node 20, 20-N buffers samples of $r_{RJ,m}$, the signal received directly from the jammer 30,30-N. In order to estimate the weights using the procedure outlined below, the STAR node 10,10-N may require an estimate of the channel $\hat{g}_{RS,m}$ between the STAR node 10,10-N and the protected receiver node 20,20-N. Several approaches are possible for estimating the STAR node-to-protected-receiver node channel. For example, during the uncovering period, the STAR node 10,10-N can transmit a channel sounding probe that arrives at the protected receiver node 20,20-N at a power level well below the jamming signal (so as not to corrupt $r_{RJ,m}$) but with sufficient power that the protected receiver node 20,20-N can estimate the channel $\hat{g}_{RS,m}$ after taking advantage of spread spectrum processing gain. Alternatively, by taking advantage of the assumption that the channel is stationary over the interval, the channel sounding probe can be sent at higher power after the uncovering period. This way it does not corrupt the estimates of $r_{RJ,m}$ and because it is sent at a higher power, the quality of the channel estimate at the receiver node 20, 20-N can be better than it would be if it were necessary to restrict the channel probe power. Another approach may be to transmit the channel probes during the protection period. The channel probes would need to be transmitted at sufficiently low power so that they do not interfere with the desired signal; however since the protection period takes up most of the interval, the possible processing gain is greater than in the second approach.

During the uncovering period for interval m, the STAR node 10,10-N also buffers samples of the signal that it receives from the jammer 30,30-N, $$r_{S,m,n} = \sum_{l=0}^{L-1} g_{SJ,m,l} s_{J,m,n-l} + n_{S,m,n} \quad (25)$$

The protected receiver node 20,20-N sends the estimate of the channel from the STAR node 10,10-N to the receiver node 20,20-N $\hat{g}_{RS,m}$ back to the STAR node 10, 10-N, which computes the estimate of the signal:

$$\begin{aligned} \hat{s}_{S,m,n} &= \sum_{l'=0}^{L'-1} \hat{g}_{RS,m,l'} r_{S,m,n-l'} \\ &= \sum_{l'=0}^{L'-1} \sum_{l=0}^{L-1} g_{SJ,m,l} \hat{g}_{RS,m,l'} s_{J,m,n-l-l'} + \\ & \sum_{l'=0}^{L'-1} \hat{g}_{RS,m,l'} n_{S,m,n-l} \end{aligned} \quad (26)$$

The AJ-STAR node 10,10-N can form:

$$\hat{S}_{S,m} = \begin{bmatrix} \hat{s}_{S,m,0} & \cdots & \hat{s}_{S,m,N-1} \\ \vdots & \ddots & \vdots \\ \hat{s}_{S,m,-L+1} & \cdots & \hat{s}_{S,m,N-L} \end{bmatrix} \quad (27)$$

The protected receiver node 20,20-N also sends samples of the signal received directly from the jammer 30,30-N, $r_{RJ,m}$, to the STAR node 10,10-N, which computes the weights:

$$w_{m+1} = (\hat{S}_{S,m}\hat{S}_{S,m}^H)^{-1}\hat{S}_{S,m} r_{RJ,m}^H \quad (28)$$

If the feedback and calculations are fast enough, the weights can be applied to the current interval, otherwise they may be applied to the next interval.

If the channel were completely stationary, once the weights were computed, there would be no need for further feedback from the protected receiver node 20,20-N to the AJ-STAR node 10,10-N. The amount of feedback required is determined by the coherence time of the channel and the signal-to-noise ratio at which the receiver node 20,20-N can measure the jamming signal (which is typically high).

In an alternative embodiment, which may be called an "adaptive" process, it may be useful to define a modified version of the cost function (EQ. 21) in which the total received signal at protected receiver node 20, 20-N is minimized, rather than simply the jammer 30, 30-N power:

$$J(w) = \|r_{RS} + r_{RJ} + r_{RD}\|^2 = |w^H S_S + r_{RJ} + r_{RD}\|^2 \quad (29)$$

The gradient of this cost function is $$\begin{aligned} \nabla J(w) &= 2S_S S_S^H w + 2S_S(r_{RJ} + r_{RD})^H \\ &= 2S_S(S_S^H w + r_{RJ}^H + r_{RD}^H) \end{aligned} \quad (30)$$

Finding where the gradient of the cost function (EQ. 30) is zero, the following may be obtained:

$$w_{minpwr} = -(S_S S_S^H)^{-1} S_S (r_{RJ} + r_{RD})^H \quad (31)$$

If the contribution of the desired transmitter node 40 to the signal at the input to the AJ-STAR node 10,10-N is negligible, then $S_S(r_{RJ}+r_{RD})^H \approx S_S r_{RJ}^H$ and the solutions in EQ. 23 and EQ. 31 are equivalent.

Using the gradient of the AJ-STAR cost function (EQ. 30) given an initial solution to the STAR weight vector at time interval m, we can compute an update for the next time step using:

$$\begin{aligned} w_{m+1} &= w_m - \frac{1}{2}\mu \nabla J(w_m) \\ &= w_m - \mu S_{S,m}(S_{S,m}^H w_m + r_{RJ,m}^H + r_{RD,m}^H) \\ &= w_m - \mu S_{S,m}\underbrace{(r_{RS,m} + r_{RJ,m} + r_{RD,m})}_{r_{RTot,m}}{}^H \\ &= w_m - \mu S_{S,m} r_{RTot,m}^H \end{aligned} \quad (32)$$

This solution does not require a separate measure at the protected receiver node 20,20-N of the direct jammer-to-receiver node signal. Thus it may not be necessary to include uncovering periods, STAR node 10,10-N can provide continuous protection, and no blanking of the desired transmitter node 40, 40-N is required.

One exemplary embodiment of an implementation of the "adaptive" process above is detailed below. An interval of $M_{int}$ samples over which the channel is stationary may be first defined.

At the STAR node 10,10-N during interval m: For the $m^{th}$ interval of $M_{int}$ samples, the STAR node 10,10-N applies taps $w_m$ sending the its modified copy of the jamming signal to the protected receiver node 20,20-N. As well, STAR node 10,10-N embeds a channel sounding probe in its transmitted signal (which is sent simultaneously with the retransmitted jamming waveform, unlike the previous section), allowing the protected receiver node 20,20-N to measure the channel between the STAR node 10,10-N and the protected receiver node 20,20-N $\hat{g}_{RS,m}$. The channel probes are sent using a waveform known at the protected receiver node 20,20-N, and are transmitted at a sufficiently low power that they do not interfere with the protected receiver node's reception of the desired signal, but they can be extracted during early iterations before the jammer 30,30-N is suppressed. This can be effectively achieved using feedback from the protected receiver node 20,20-N to adjust the channel probe power. During this same interval, the STAR node 10,10-N buffers $N_{buf}$ samples received at its input:

$$r_{S,m,n} = \left( \sum_{l=0}^{L-1} g_{SJ,m,l} s_{J,m,n-l} + g_{SD,m,l} s_{D,m,n-l} \right) + n_{S,m,n} \tag{33}$$

At the protected node 20, 20-N during interval m: The protected node buffers $N_{buf}$ samples of the jamming signal received during the interval $r_{RTot,m}$. Note that $N_{buf}$ can be much smaller than $M_{int}$ samples. As well, the protected node estimates the channel $\hat{g}_{RS,m}$ between the STAR node 10,10-N and the protected node 20, 20-N using the channel sounding probes.

Feedback and update during interval m: The protected receiver node 20,20-N sends the $N_{buf}$ buffered samples $r_{RTot,m}$ along with the estimated channel coefficients $\hat{g}_{RS,m}$ to STAR node 10,10-N via the feedback channel. At the STAR node 10,10-N, the buffered values of $r_{S,m}$ are convolved with $\hat{g}_{RS,m}$ resulting in $$\begin{aligned} \hat{s}_{S,m,n} &= \sum_{l'=0}^{L'-1} \hat{g}_{RS,m,l'} r_{S,m,n-l'} \\ &= \sum_{l'=0}^{L'-1} \sum_{l=0}^{L-1} g_{SJ,m,l} \hat{g}_{RS,m,l'} s_{J,m,n-l-l'} + \\ &\quad \sum_{l'=0}^{L'-1} \sum_{l=0}^{L-1} g_{SD,m,l} \hat{g}_{RS,m,l'} s_{D,m,n-l-l'} + \\ &\quad \sum_{l'=0}^{L'-1} \hat{g}_{RS,m,l'} n_{S,m,n-l} \end{aligned} \tag{34}$$

The STAR node 10,10-N forms $$\hat{S}_{S,m} = \begin{bmatrix} \hat{s}_{S,m,0} & \cdots & \hat{s}_{S,m,N-1} \\ \vdots & \ddots & \vdots \\ \hat{s}_{S,m,-L+1} & \cdots & \hat{s}_{S,m,N-L} \end{bmatrix} \tag{35}$$

Equation 32 my be applied to obtain the taps at time m+1:

$$w_{m+1} = w_m - \mu \hat{S}_{S,m} r_{RTot,m}^H \tag{36}$$

One advantage of the adaptive approach is that the update can be performed using only samples of the total signal at the protected receiver node 20,20-N with the STAR cancellation active. This allows the STAR solution to be updated to track time-varying channels, without tuning off the protection of the STAR node. This may be advantageous when STAR node 10, 10-N is being used to protect legacy waveforms that cannot tolerate periodically allowing the jamming signal to appear unmitigated, as needed to directly implement the optimal solution of the "one-step" process, as described herein.

In another embodiment, the one-step process and the adaptive process can be used together. For example, the one-step process can be used to obtain an initial solution, then the adaptive process can be used to update the STAR node taps.

The amount of suppression that can be achieved in, for instance, the steady state example can be calculated for both the one-step and adaptive processes. For the one-step update (EQ. 23), if the weights are updated when the desired signal is blanked, in the case of frequency flat channels and a single-tap AJ-STAR node filter, the optimal weight vector is:

$$\begin{aligned} w_{opt} &= -\frac{g_{SJ} g_{RJ}^* P_J}{g_{RS}^* (|g_{SJ}|^2 P_J + \sigma_S^2)} \\ &= -\frac{g_{RS} g_{SJ} g_{RJ}^* P_J}{|g_{RS}|^2 (|g_{SJ}|^2 P_J + \sigma_S^2)} \end{aligned} \tag{37}$$

where $\sigma_S^2$ is the variance of the self-interference and noise at STAR node 10,10-N. The total received signal at the protected received during the protection period (when the desired transmitter node 40 is not blanked) is:

$$\begin{aligned} r_{Rtot} &= \frac{1}{1 + \frac{|g_{SJ}|^2 P_J}{\sigma_S^2}} \left[ r_{RJ} + \left(1 + \frac{|g_{SJ}|^2 P_J}{\sigma_S^2} - \frac{g_{SJ}^* g_{SD} g_{RJ} P_J}{\sigma_S^2 g_{RD}}\right) r_{RD} - \right. \\ &\quad \left. \frac{g_{SJ}^* g_{RJ} P_J}{\sigma_S^2} n_S \right] + n_R \\ &= \frac{1}{1 + \rho_{SJ}} \left[ r_{RJ} + \left(1 + \rho_{SJ} - \frac{g_{SD} g_{RJ}}{g_{SJ} g_{RD}} \rho_{SJ}\right) r_{RD} - \frac{g_{RJ}}{g_{SJ}} \rho_{SJ} n_S \right] + n_R \\ &= \left(\frac{1}{1 + \rho_{SJ}}\right) r_{RJ} + \left(1 - \frac{g_{SD} g_{RJ}}{g_{SJ} g_{RD}} \frac{\rho_{SJ}}{1 + \rho_{SJ}}\right) r_{RD} - \\ &\quad \frac{g_{RJ}}{g_{SJ}} \frac{\rho_{SJ}}{1 + \rho_{SJ}} n_S + n_R \end{aligned} \tag{38}$$

where $n_R$ is the noise at the protected receiver node 20,20-N and $\rho_{SJ}$ is the ratio of the jamming signal to noise and self-interference at the AJ-STAR 10, 10-N. For $\rho_{SJ} >> 1$, $$r_{Rtot} \approx \frac{1}{\rho_{SJ}} r_{RJ} + \left(1 - \frac{g_{SD} g_{RJ}}{g_{SJ} g_{RD}}\right) r_{RD} - \frac{g_{RJ}}{g_{SJ}} n_S + n_R \tag{39}$$

In the case of the adaptive update in EQ. 32, the solution is updated in the presence of the desired signal. For frequency flat channels with a single tap AJ-STAR node 10,10-N, this leads to:

$$\begin{aligned} r_{Rtot} = \frac{1}{1 + \rho_{SJ} + \rho_{SD}} \Bigg[ &\left(1 + \rho_{SD} - \frac{g_{RD} g_{SJ}}{g_{RJ} g_{SD}} \rho_{SD}\right) r_{RJ} + \\ &\left(1 + \rho_{SJ} - \frac{g_{RJ} g_{SD}}{g_{RD} g_{SJ}} \rho_{SJ}\right) r_{RD} - \left(\frac{g_{RJ} \rho_{SJ}}{g_{SJ}} + \frac{g_{RD} \rho_{SD}}{g_{SD}}\right) n_S \Bigg] + n_R \end{aligned} \tag{40}$$

where $\rho_{SJ}$ is the ratio of the jamming signal to noise and self-interference, and $\rho_{SD}$ is the ratio of the desired signal to the noise and self-interference at STAR node 10,10-N during the adaptation period.

If $\rho_{SJ} >> \rho_{SD} + 1$, $$r_{Rtot} \approx \frac{1}{\rho_{SJ}} r_{RJ} + \left(1 - \frac{g_{RJ} g_{SD}}{g_{RD} g_{SJ}}\right) r_{RD} - \frac{g_{RJ}}{g_{SJ}} n_S + n_R \tag{41}$$

If $\rho_{SD} >> \rho_{SJ}+1$, $$r_{Rtot} \approx \left(1 - \frac{g_{RD} g_{SJ}}{g_{RJ} g_{SD}}\right) r_{RJ} + \frac{1}{\rho_{SD}} r_{RD} - \frac{g_{RD}}{g_{SD}} n_S + n_R \quad (42)$$

This last expression illustrates that if STAR node 10,10-N receiver 105 is "captured" by the desired transmission instead of the jamming signal when using the adaptive update approach, the AJ-STAR node will attempt to cancel the desired transmission signal instead of the jamming signal at the protected receiver node 20,20-N.

Referring again to FIGS. 4B-4D, the following discussion provides a basis for embodiments including multiple receiver nodes 20, 20-N and/or multiple jammer nodes 30, 30-N. For simplicity, the discussion below considers frequency flat channels. In the following, $g_{RS,n,q}$ represents the channel from STAR node q 10, 10-N to receiver node n 20, 20-N, $g_{RJ,n,p}$ represents the channel from jammer node p 30, 30-N to receiver node n 20, 20-N, $g_{SJ,q,p}$ represents the channel from jammer node p 30, 30-N to STAR node q 10, 10-N, $\eta_q$ is the noise added at STAR node q 10, 10-N, and $w_q$ is the complex weight applied to the signal at STAR node q. The total received signal at receiver node n is:

$$r_{Tot,n}(t) = \underbrace{\sum_{p=0}^{P-1} \left( w^H \begin{bmatrix} g_{RS,n,0} g_{SJ,0,p} \\ \vdots \\ g_{RS,n,Q-1} g_{SJ,Q-1,p} \end{bmatrix} + g_{RJ,n,p} \right) s_{J,p}(t)}_{\text{Adjust } w \text{ to minimize this quantity}} + \sum_{q=0}^{Q-1} w_q^* g_{RS,n,q} \eta_q(t) + n_n(t) \quad (43)$$

The total received jamming signal at the protected receiver node 20,20-N is driven by the quantity $$w^H \begin{bmatrix} g_{RS,n,0} g_{SJ,0,0} & \cdots & g_{RS,n,0} g_{SJ,0,P-1} \\ \vdots & \ddots & \vdots \\ g_{RS,n,Q-1} g_{SJ,Q-1,0} & \cdots & g_{RS,n,Q-1} g_{SJ,Q-1,P-1} \end{bmatrix} + [\, g_{RJ,n,0} \;\cdots\; g_{RJ,n,P-1} \,] = w^H G_n + g_{RJ} \quad (44)$$

which is to be minimized.

In one example, there may be one jamming node 30, 30-N and multiple receiver nodes 20, 20-N, as in FIG. 4B. A desired response may be obtained if the number of STAR nodes 10,10-N is greater than or equal to the number of receiver nodes 20,20-N. For any receiver node n, $$w^H g_n + g_{RJ,n} = w^H \begin{bmatrix} g_{RS,n,0} g_{SJ,0} \\ \vdots \\ g_{RS,n,Q-1} g_{SJ,Q-1} \end{bmatrix} + g_{RJ,n} \quad (45)$$

For receiver $n$

Concatenating values for the different receiver nodes n:

$$w^H \underbrace{[\, g_0 \;\cdots\; g_{N-1} \,]}_{A} + \underbrace{[\, g_{RJ,0} \;\cdots\; g_{RJ,N-1} \,]}_{g_{RJ}} = w^H A + g_{RJ} \quad (46)$$

One solution w to the under-determined set of equations may be found. If the number of STAR nodes 10,10-N, Q, is greater than or equal to the number of receiver nodes, N (and $U_1$ is Q×N)

$$w^H [\, U_1 \;\; U_2 \,] \begin{bmatrix} S_1 \\ 0 \end{bmatrix} V^H = -g_{RJ} \quad (47)$$

$$w^H U_1 S_1 V^H = -g_{RJ}$$

$$w^H U_1 = -g_{RJ} V S_1^{-1}$$

One solution to the above equation can be found by setting the last Q−N elements of w to zero. $U_1$ can then be partitioned into:

$$U_1 = \begin{bmatrix} U_{1s} \\ U_{1n} \end{bmatrix} \quad (48)$$

where $U_{1s}$ is Q×Q. If an invertible subset $U_{1s}$ can be found, then the first Q elements of w are $$w_{1s}^H = g_{RJ} V S_1^{-1} U_{1s}^{-1} \quad (49)$$

In another example, there may be multiple jamming nodes 30, 30-N and one receiver node 20, 20-N, as in FIG. 4C. In this example, a desired response may be obtained if the number of STAR nodes 10,10-N is greater than or equal to the number of jammer nodes 30, 30-N.

$$w^H \begin{bmatrix} g_{RS,n,0} g_{SJ,0,0} & \cdots & g_{RS,n,0} g_{SJ,0,P-1} \\ \vdots & \ddots & \vdots \\ g_{RS,n,Q-1} g_{SJ,Q-1,0} & \cdots & g_{RS,n,Q-1} g_{SJ,Q-1,P-1} \end{bmatrix} + [\, g_{RJ,n,0} \;\cdots\; g_{RJ,n,P-1} \,] = w^H G_n + g_{RJ,n} \quad (50)$$

A solution w to the under-determined set of equations may be found using the same approach as above.

In the approaches described above and illustrated by FIGS. 4A-4D each STAR node 10, 10-N may only be able to retransmit a modified version of what it obtains on its own receiving antenna 5. As a result, the number of STAR nodes 10, 10-N required to provide protection may need to be at least $N_R \times N_J$ where $N_R$ is the number of protected receive nodes 20, 20-N and $N_J$ is the number of jamming nodes 30, 30-N. Alternative embodiments may, for example, use a Multiple-Input and Multiple-Output (MIMO) STAR node 10, 10-N in place of or in addition to multiple STAR nodes. Referring to FIG. 1A again, a STAR node 10, 10-N capable of MIMO operation may have $N_{SR}$ receive antennas 5, 105 available and $N_{ST}$ transmit antennas 5, 110. Such a STAR node may be called a MIMO STAR node 10, 10-N. A MIMO STAR node 10, 10-N may apply an $N_{ST} \times N_{SR}$ weight matrix W that maps signals from all of the receiver antennas 5, 105 to all of the output antennas 5, 110. Then, the W that solves $$H_{RS}(f) W(f) H_{SJ}(f) = -H_{RJ}(f) \quad (51)$$

where $H_{RS}(f)$ is the MIMO matrix channel ($N_R \times N_{ST}$) mapping each AJ-STAR transmit antenna to each protected receive antenna, $H_{SJ}(f)$ is the MIMO matrix channel ($N_{SR} \times N_J$) mapping each jamming antenna to each AJ-STAR receive antenna, and $H_{RJ}(f)$ is the MIMO matrix channel ($N_R \times N_J$) between the jammers and the protected receiver. As long as $N_{ST} \geq N_R$ and $N_{SR} \geq N_J$, we can find a solution for W(f)

in the above expression that will simultaneously cancel the jamming signal at all protected receive antennas. If this condition is met, then a solution for W(f) is $$W(f) = \begin{bmatrix} -H^{-1}_{RS(cols\ 1\ \ldots\ N_r)}(f)H_{RJ}(f)H^{-1}_{SJ(rows\ 1\ \ldots\ N_j)}(f) & 0_{N_R\times(N_{SR}-N_J)} \\ 0_{(N_{ST}-N_R)\times N_J} & 0_{(N_{ST}-N_R)\times(N_{SR}-N_J)} \end{bmatrix} \quad (52)$$

assuming that the required matrix inverses exist.

For example, with four jamming nodes 30, 30-N and four protected receiver nodes 20, 20-N, an a MIMO STAR node 10, 10-N using $N_{SR}$=4 and $N_{ST}$=4 as described above may effectively cancel the four jamming signals and protect the four receiver nodes. By comparison, sixteen non-MIMO STAR nodes 10, 10-N, each having a single receive antenna 5, 105 and transmitter antenna 5, 110, would be needed to cancel four jamming signals and protect four receiver nodes 20, 20-N.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

While several aspects have been described and depicted as set forth herein, alternative aspects may be effected by those skilled in the art to accomplish the same objectives. Accordingly, it is intended by the appended claims to cover all such alternative aspects as fall within the true spirit and scope of the invention.

What is claimed is:

1. A method comprising:

obtaining a jamming signal and a feedback signal;

processing the jamming signal and the feedback signal; and, outputting a cancellation signal, wherein processing the jamming signal and the feedback signal comprises:

determining a jamming channel based on the jamming signal and a feedback channel based on the feedback signal.

2. The method of claim 1, wherein processing the jamming signal and the feedback signal comprises:

obtaining a transmission channel;

combining the transmission channel, the jamming channel, and the feedback channel to determine a transfer function, the transfer function being configured to determine the cancellation signal; and, generating the cancellation signal.

3. The method of claim 2, wherein determining the transfer function further comprises combining a delay function, the delay function being dependent, at least in part, on a delay time t, wherein delay time t is a difference between a time $t_1$ and a time $t_2$, wherein time $t_1$ comprises a time of receiving the jamming signal and transmitting the cancellation signal to a receiver node and time $t_2$ comprises a time of receiving the jamming signal at the receiver node.

4. An apparatus comprising:

a signal processing circuit, the signal processing circuit being configured to perform a method, the method comprising:

obtaining a jamming signal and a feedback signal, the jamming signal being wireless received from a jamming node and the feedback signal being wirelessly received from a protected receiver;

processing the jamming signal and the feedback signal to determine a cancellation signal; and, outputting the cancellation signal.

5. The apparatus of claim 4, wherein the cancellation signal is wirelessly transmitted to a receiver node.

6. The apparatus of claim 4, wherein the method further comprises:

obtaining a transmission channel;

determining a jamming channel based on the jamming signal and a feedback channel based on the feedback signal;

combining the transmission channel, the jamming channel, and the feedback channel to determine a transfer function, the transfer function being configured to determine the cancellation signal; and, generating the cancellation signal.

7. The apparatus of claim 4, wherein the feedback signal is received from a receiver node.

8. The apparatus of claim 7, wherein the receiver node obtains the jamming signal, and wherein the feedback signal comprises at least a portion of the jamming signal obtained by the receiver node.

9. The apparatus of claim 7, wherein the receiver node is one receiver node of a plurality of receiver nodes and the feedback signal is one feedback signal of a plurality of feedback signals obtained by the plurality of receiver nodes.

10. The apparatus of claim 4, wherein the jamming signal is received from a jamming node.

11. The apparatus of claim 10, wherein the jamming node is one jamming node of a plurality of jamming nodes and the jamming signal is one jamming signal of a plurality of jamming signals.

12. The apparatus of claim 4, wherein the receiver node is one receiver node is of a plurality of receiver nodes and the jamming node is one jamming node of a plurality of jamming nodes, the feedback signal is one feedback signal of a plurality of feedback signals and the jamming signal is one jamming signal of a plurality of jamming signals, and wherein the apparatus further comprises a plurality of receive antennas at least equal to the plurality of jamming nodes and a plurality of transmit antennas at least equal to the plurality of receiver nodes, wherein the method further including determining a plurality of jamming channels and determining a plurality of feedback channels; and, mapping each one of the plurality of jamming channels to the plurality of feedback channels.

13. The apparatus of claim 4, wherein the apparatus is further configured to analyze one or more predictable components of the jamming signal and reproduce the one or more predictable components of the jamming signal.

14. A method comprising:

obtaining a jamming signal and a feedback signal, the jamming signal being wirelessly received from a jamming node;

processing the jamming signal and the feedback signal; and, outputting a cancellation signal, the cancellation signal being wirelessly transmitted to a receiver node.

15. The method of claim 14, wherein the obtaining, processing, and outputting are carried out by at least one node, the at least one node comprising a signal processing circuit configured to obtain the jamming signal and feedback signal, process the jamming signal and the feedback signal, and output the cancellation signal.

16. The method of claim 14, wherein obtaining the jamming signal and the feedback signal comprises obtaining a raw jamming signal and a raw feedback signal.

17. The method of claim 14, wherein obtaining at least one of the jamming signal and the feedback signal comprises obtaining a reduced frequency jamming signal and a reduced frequency feedback signal, wherein the reduced frequency jamming signal includes a representation of a jamming carrier wave signal and the reduced frequency feedback signal includes a representation of a feedback carrier wave signal.

18. The method of claim 14, wherein outputting the cancellation signal comprises outputting the cancellation signal at a transmission frequency.

19. The method of claim 14, wherein outputting the cancellation signal comprises outputting a reduced frequency signal to be up-converted by a radio-frequency transmitter.

20. The method of claim 14, wherein the feedback signal is wirelessly received from the receiver node.

21. The method of claim 14, wherein the jamming signal is a hostile jamming signal.

22. A method comprising:

obtaining a jamming signal and a feedback signal;

processing the jamming signal and the feedback signal; and outputting a cancellation signal to a radio-frequency transmitter, wherein the radio-frequency transmitter transmits the cancellation signal to a protected receiver node, wherein the radio-frequency transmitter is separated from the protected receiver node.

23. The method of claim 22, wherein there is relative movement between the radio-frequency transmitter and the protected receiver node.

24. The method of claim 22, wherein the obtaining includes obtaining the jamming signal from a radio-frequency receiver that receives the jamming signal from a jamming node, and wherein the radio-frequency receiver is separated from the jamming node.

25. The method of claim 24, wherein there is relative movement between the radio-frequency receiver and the jamming node.

26. A method comprising:

obtaining at a transmitting and receiving node a jamming signal and a feedback signal, wherein the jamming signal is wirelessly received at the transmitting and receiving node from a jamming node;

processing at the transmitting and receiving node the jamming signal and the feedback signal for determining a cancellation signal, wherein the determining includes using a transfer function, the transfer function being in dependence on a time delay between a time the jamming signal is transmitted by the jamming node and a time the jamming signal is wirelessly received at the transmitting and receiving node from a jamming node; and outputting the cancellation signal.

27. The method of claim 26, wherein the transfer function is in dependence on a time delay between the time the jamming signal is transmitted by the jamming node and a time the jamming signal is received at a receiver node.

28. An apparatus comprising:

a signal processing circuit, the signal processing circuit being configured to perform a method, the method comprising:

obtaining one or more jamming signal and a plurality of feedback signals;

processing the one or more jamming signal and the plurality of feedback signals to determine a plurality of cancellation signals; and outputting the plurality of cancellation signals for transmission to one or more receiver node, wherein the method further includes determining a plurality of jamming channels and determining a plurality of feedback channels; and mapping each one of the plurality of jamming channels to the plurality of feedback channels.

* * * * *